United States Patent [19]
McKee

[11] 3,791,909
[45] Feb. 12, 1974

[54] METHOD OF LAMINATING POLYIMIDE FILM

[75] Inventor: Ian K. McKee, Princeton, N.J.

[73] Assignee: Circuit Materials Division Dodge Industries, Inc., Hoosick Falls, N.Y.

[22] Filed: Jan. 12, 1972

[21] Appl. No.: 217,229

[52] U.S. Cl............... 156/306, 117/47 A, 156/272, 161/189, 161/227, 161/411
[51] Int. Cl. .......................... C09j 5/02, B32b 31/12
[58] Field of Search................... 117/47 R, 47 A; 156/272, 306, 331, 333; 161/189, 227, 411

[56] References Cited
UNITED STATES PATENTS

| | | | |
|---|---|---|---|
| 3,455,774 | 7/1969 | Lindsey et al. | 161/189 |
| 3,627,624 | 12/1971 | Kreuz et al. | 161/165 |
| 3,030,290 | 4/1962 | Ryan | 204/169 |
| 3,505,168 | 4/1970 | Dunphy et al. | 161/227 |
| 3,684,646 | 8/1972 | Kreuz et al. | 161/165 |

Primary Examiner—Alfred L. Leavitt
Assistant Examiner—Robert A. Dawson
Attorney, Agent, or Firm—Parker, Plyer & McEachran

[57] ABSTRACT

A process of laminating a polyimide film and a film of a completely fluorinated ethylene-propylene copolymer, the later film having one surface rendered cementable, by bringing together one surface of said polyimide film and said cementable surface of said fluorinated ethylene-propylene film under pressure and with the application of heat.

5 Claims, No Drawings

METHOD OF LAMINATING POLYIMIDE FILM

SUMMARY OF THE INVENTION

This invention is concerned with a process of laminating a polyimide film and a film of a completely fluorinated ethylene-propylene copolymer.

An object of this invention is a simplified process of laminating a polyimide film and a film of completely fluorinated ethylene-propylene copolymer.

Another object is a process of laminating the aforementioned films which eliminates the requirement of first drying the polyimide film to lower its moisture content.

Another object is a process of laminating the above-mentioned films at lower temperatures and pressures than those presently being used in making such laminations.

Another object is a process of laminating the aforementioned films to obtain a bond between the films of about 1 pound per square inch.

Another object is a process of laminating the aforementioned films for use in the manufacture of printed circuits in which a higher bond between the films is later developed during press laminating operations.

Other objects may be found in the following specification and claims.

DESCRIPTION OF THE PREFERRED EMBODIMENT

The process of this invention utilizes a polyimide film sold under the trademark "KAPTON" and a completely fluorinated ethylene-propylene copolymer film sold under the designation "TEFLON" FEP-fluorocarbon film, both of which are sold by E.I. DuPont de Nemours & Co. (Inc.) of Wilmington, Del. The FEP-fluorocarbon film is further identified by the designation "Type C" and has one surface modified to permit its use in laminations. The material treated on both sides for adhesion and designated type C-20 may also be used.

The films are brought together with the modified or cementable surface of the FEP-fluorocarbon film contacting a surface of the polyimide film. With these surfaces in contact with each other, the films are subjected to heat and pressure to obtain a bonding force between the films on the order of 1 pound or less per square inch.

One way of subjecting the contacting films to heat and pressure is to run them between rollers, at least one of which is heated. For example, using a heated steel roller approximately 12 inches in diameter and a rubber roller 9 inches in diameter having a Shore A Durometer hardness of 90, satisfactory bonding has been obtained when the temperature of the steel roll is in the range of 100° to 200° C., the rollers are exerting a pressure against each other in the range of ½ to 20 pounds per square inch and the films are moved between the rollers at a speed in the range of ½ to 20 feet per minute. It is preferable that the polyimide film contact the heated roller.

The best results in the above ranges are obtained when the temperature of the steel roller is approximately 150°C., the rollers are exerting a pressure against each other in the range of 2 to 8 pounds per square inch and the films are being moved between the rollers at a speed in the range of 4 to 6 feet per minute.

This invention is not necessarily limited to the above described method of subjecting the films to pressure and heat. Other methods of applying heat and pressure to films may also be used so long as approximately the same pressures and temperatures described above are used.

The laminated product is ready for use, for example, in making printed circuit boards in a subsequent press laminating operation in which a greater bonding force between the polyimide film and the FEP-fluorocarbon film is obtained.

The method of this invention eliminates many of the steps now presently considered necessary in order to obtain a bond between a polyimide film and a FEP-fluorocarbon film. For example, with this method, it is not necessary to reduce the moisture content of the polyimide film to below about 1 percent by weight as was previously considered necessary. Nor is it necessary to subject the films to temperatures in the 240° to 280° C. range during the laminating step as was previously considered necessary.

The bonding force between the polyimide and FEP-fluorocarbon films, while low, is sufficient, for example, when the laminate is to be used in preparing printed circuits in which a subsequent press lamination step develops a greater bonding force between the films.

Whereas, the preferred method of the invention has been described it should be understood that there are modifications, alterations and changes which may be made without departing from the teachings of the invention. Therefore, the scope of the invention should be only limited by the claims attached hereto.

I claim:

1. The process of laminating a polyimide film and a film of completely fluorinated ethylene-propylene copolymer, the later film having one surface rendered cementable, by bringing together one surface of said polyimide film and said cementable surface of said ethylene-propylene film under a pressure in the range of ½ to 20 pounds per square inch and at a temperature in the range of 100° to 200°C. to obtain a bonding force between the films on the order of 1 pound per square inch.

2. The process of claim 1 in which said films are brought together under a pressure in the range of 2 – 8 pounds per square inch.

3. The process of claim 1 in which said films are brought together at a temperature of approximately 150°C.

4. The process of claim 1 in which said films are brought together by moving the films, while in contact with each other, between rollers, at least one of which is heated, which rollers exert said pressure against the films, and the films are moved between the rollers at a speed in the range of ½ to 20 feet per minute.

5. The process of claim 4 in which said films are moved between said rollers at a speed in the range of 4 to 6 feet per minute.

* * * * *